(12) United States Patent
Suzuki

(10) Patent No.: US 6,222,639 B1
(45) Date of Patent: Apr. 24, 2001

(54) METHOD AND APPARATUS FOR PRODUCING COLOR CONVERSION TABLE

(75) Inventor: Masahiro Suzuki, Chiba (JP)

(73) Assignee: Seiko Instruments Information Devices INC (JP)

( * ) Notice: Subject to any disclaimer, the term of this patent is extended or adjusted under 35 U.S.C. 154(b) by 0 days.

(21) Appl. No.: 09/074,343

(22) Filed: May 7, 1998

(30) Foreign Application Priority Data

May 8, 1997 (JP) .................................................. 9-117709
May 6, 1998 (JP) ................................................ 10-123609

(51) Int. Cl.$^7$ ............................ G06F 15/00; G06K 9/00; G03F 3/08
(52) U.S. Cl. ............................ 358/1.9; 358/523; 382/162
(58) Field of Search .................................. 358/518, 523, 358/529, 524, 1.9, 1.1, 1.6, 1.13, 1.16; 382/162, 165, 167

(56) References Cited

U.S. PATENT DOCUMENTS

| 4,561,016 | 12/1985 | Jung et al. ............................. 358/76 |
| 5,084,762 | * 1/1992 | Miyakawa ........................... 358/529 |
| 5,881,211 | * 3/1999 | Matsumura .......................... 358/523 |
| 5,937,087 | * 8/1999 | Sesanuma et al. .................... 382/167 |

FOREIGN PATENT DOCUMENTS

| 4335143 | 4/1995 | (DE) . |
| 096090A1 | 12/1983 | (EP) . |
| 604755A1 | 7/1994 | (EP) . |
| 681396A2 | 11/1995 | (EP) . |
| 758181A2 | 2/1997 | (EP) . |
| 7322081 | 5/1994 | (JP) . |
| 8511141 | 10/1994 | (JP) . |
| 8321959 | 5/1995 | (JP) . |
| 99080 | 6/1995 | (JP) . |
| 10304213 | 3/1998 | (JP) . |
| 10309833 | 3/1998 | (JP) . |
| WO9320648 | 10/1993 | (WO) . |

OTHER PUBLICATIONS

Systems and computers in Japan, vol. 20, No. 7, Jul. 1, 1989, Johji Tajima, pp. 110–112, "Optimum Color Masking Matrix Determination for Digital Color Platemaking, Using Virtual Color Samples".

Journal of Electronic Imaging, vol. 3, No. 4, Oct. 1, 1994, P–Chieh Hung, pp. 415–424, "Smooth Colorimetric Calibration Technique Utilizing the Entire Color Gamut of CMYK Printers".

* cited by examiner

Primary Examiner—Madeleine Nguyen
(74) Attorney, Agent, or Firm—Adams & Wilks

(57) ABSTRACT

An apparatus for producing color conversion table comprises a target color characteristic description table described with a relationship between input color data of a target color output apparatus and the color value of a color output therefrom, a reproduction color characteristic description table described with a relationship between input color data of a reproduction color output apparatus and the color value of a color output therefrom, data value conversion means for converting data values of input color data to data values of black corresponding to the reproduction color output apparatus, and evaluation means for comparing color value data of the target color output apparatus with respect to input data and color value data of the reproduction color output apparatus corresponding to input data that includes the converted black data values, whereby post-conversion color data values are computed from the compared results of the evaluation means to thereby produce a color conversion table.

12 Claims, 3 Drawing Sheets

METHOD AND APPARATUS FOR PRODUCING COLOR CONVERSION TABLE

BACKGROUND OF THE INVENTION

The present invention relates to a method and an apparatus for producing a color conversion table that is used when performing color conversion of data of a colored picture.

As a known method color printing using a digital color printer there is known a method wherein simulation is performed of a typographical printing. Namely, by printing using a digital color printer digital color data of cyan (C), magenta (M), yellow (Y) and black (K) that are generally used in the typographical printing, it is possible to estimate the finish of a printing or check the contents of the printing without actually preparing a form of the printing or performing actual printing by a printing machine.

However, ordinarily, a desired reproduction color itself is not obtained with mere printing performed by the digital color printer. Namely, this is because the color of ink used for typographical printing and the color obtained by color mixing are generally different from the color printed by the digital color printer, with respect to the same color data. In view of this, when attempting to obtain a reproduction color used for typographical printing by the printing method performed by the digital color printer, there is a method of performing color conversion of the input color data so as to obtain the same reproduction color as the color that is given when typographical printing has been performed based on use of the same color data therein. As a method of performing the color conversion, there is a known method wherein color conversion is performed with reference to a color conversion table.

FIG. 2 is a constructional view illustrating a case where color conversion is performed reference referring to the color conversion table. Reference numeral 10 denotes a host computer that prepares and edits digital color data used in the typographical printing, 11 denotes color data memory means that stores therein this color data, 12 denotes color conversion means that converts the color data that has been input, 13 denotes a color conversion table used by the color conversion means, and 14 denotes a digital color printer that performs color printing by the use of post-color-conversion data. The color data prepared and edited by the host computer 10 or the color data stored in the color data memory means 11 is sent to the color conversion means 12. Usually, color data is composed of (C), (M), (Y) and (K) (cyan, magenta, yellow and black, respectively) components. The color conversion means 12 converts the (C), (M), (Y) and (K) color data to (C') , (M'), (Y') and (K') so that printed-color correspondence may hold true when being printed by the digital color printer 14. In the color conversion table 13, there are stored beforehand output values to be generated in response to the input values that have been determined considering the characteristic of the target typographical printing and the characteristic of the digital color printer used in the printing process.

In the color conversion table, although a number of values with respect to all input value cases may be prepared previously, the a reduced number of values for the purposes of decreasing the memory capacity are ordinarily stored therein and interpolation processing is performed when reference is made to the color conversion table. When printing the color (C'), (M'), (Y') and (K') converted by the color conversion means 12 by the use of the digital color printer 14, there are obtained the same colors as those which are obtained when plating or typographical printing has been performed using the initial (C), (M), (Y) and (K) color data.

Next, a method of producing the above-described color conversion table will be explained. Here, an explanation will be given of a case where each of the input and output of the color conversion is composed of, for example, three components such as (C), (M) and (Y). FIG. 3 is a block diagram illustrating a conventional method of producing the color conversion table. Reference numeral 1 denotes a target color characteristic description table defined with respect to a relationship between the input color data of a target color output apparatus and the color value of a color output therefrom and 2 denotes a reproduction color characteristic description table defined with respect to a relationship between the input color data of a reproduction color output apparatus and the color value of a color output therefrom. Here, the target color output apparatus is a color output apparatus whose color is a target with respect to which color coincidence is to be achieved and, for example, is a printing machine. Also, the reproduction color output apparatus is a color output apparatus wherein actual color printing is to be performed and, for example, is a digital color printer. As the color value there is used, for example, a CIE 1976 ($L^*a^*b^*$) which is well known as a uniform color space. The target color characteristic description table 1 or reproduction color characteristic description table 2 can be produced by directly measuring by a colorimeter the color that is output from the target color output apparatus or reproduction color output apparatus. Also, the table 1 or 2 can be produced by computing the measured color values with the use of a theoretical formula such as a Neugebauer equation. Reference numeral 3 denotes an address generating means A for generating an address value with respect to the target color characteristic description table 1, and reference numeral 4 denotes an address generating means B for generating an address value with respect to the reproduction color characteristic description table 2. Reference numeral 5 denotes evaluation means for performing evaluation on the basis of the color values output by the target color characteristic description table 1 and reproduction color characteristic description table 2. Reference numeral 6 denotes determination means for performing determination on the basis of the evaluated results of the evaluation means 5, and Reference numeral 7 denotes color conversion table data memory means in which there is stored beforehand computed color conversion table data.

First, though the control of control means (not illustrated), the address generating means A 3 generates the (C), (M) and (Y) values used as the input values of the color conversion table while sequentially looping these values. The target color characteristic description table 1 sends to the evaluation means 5 the color values corresponding to the (C), (M) and (Y) values generated by the address generating means A 3. Also, the control means causes the address generating means B 4 to generate all (C), (M) and (Y) combination values corresponding to the input of the reproduction color characteristic description table 2 with respect to one set of (C), (M) and (Y) values generated by the address generating means A 3. The reproduction color characteristic description table 2 sends to the evaluation means 5 the color values corresponding to the (C), (M) and (Y) values generated by the address generating means A 3. The evaluation means 5 compares the color values obtained from the target color characteristic description table 1 and those obtained from the reproduction color characteristic description table 2 and evaluates based on this comparison. As the evaluation method, there is computed the color difference $\Delta E^*ab$ that is obtained by computing the square root of the sum of the differences between the respective corresponding values of, for example, two sets of (L*, a*, b*). The determination means 6 makes its determination based on the use of the evaluated value of the evaluation means 5 and selects one set of color values of the reproduction color characteristic description table 2 that are the nearest to the color values obtained from the target color characteristic description table 1. As the determination method, there are selected, for example, the color value which produce a minimum color difference ΔE*ab value determined by the evaluation means 5. Next, the color data values (C'), (M') and (Y') which give the color values selected by the determination means are stored in the color conversion table data memory means 7 as post-conversion values of the (C), (M) and (Y) values of the color conversion table obtained from the address generating means A 3. The above-described operation is performed while sequentially looping the (C), (M) and (Y) values generated by the address generating means 3. As a result, in the color conversion table data memory means 7 there is produced a color conversion table necessary for color conversion.

Incidentally, although an explanation has been given of a case where the address generating means B 4 generates all combinations (C), (M) and (Y) values corresponding to the input of the reproduction color characteristic description table 2 with respect to one set of (C), (M) and (Y) values generated by the address generating means A 3, if the same results are obtained, the address generating means B 4 is not needed at all times to generate all combinations (C), (M) and (Y) values.

As explained above, in a case where the input of the reproduction color characteristic description table 2 is composed of three parameters such as (C), (M) and (Y), since there is the nature that a particular color is determined by a single combination of (C), (M) and (Y), it has been possible to determine optimum values of (C), (M) and (Y) by the determination means.

However, in a case where the input of the reproduction color characteristic description table 2 has four parameters, such as (C), (M), (Y) and (K), the combination of optimum (C), (M), (Y) and (K) values with respect to a particular color is not singularly determined and many combinations are inconveniently obtained. For this reason, there has been the problem that it has thus far been impossible to determine a single optimum value from the conventional color values.

The present invention has been made in view of the above-described respects and has as an object the production of a color conversion table whose output is (C), (M), (Y) and (K) easily and highly precisely.

SUMMARY OF THE INVENTION

The present invention provides an apparatus for producing a color conversion table that is used when converting input data consisting of values of respective colors of cyan, magenta, yellow and black corresponding to a target color output apparatus to data of values of the same respective colors corresponding to a reproduction color output apparatus for every set of input data, the apparatus comprising a target color characteristic description table defining a relationship between input color data of the target color output apparatus and the color value of a color output therefrom, a reproduction color characteristic description table defining a relationship between input color data of the reproduction color output apparatus and the color value of a color output therefrom, data value conversion means for converting data values of input color data to data values of black corresponding to the reproduction color output apparatus, and evaluation means for comparing color value data of the target color output apparatus with respect to input data and color value data of the reproduction color output apparatus corresponding to input data that includes the converted black data value, whereby post-conversion color data values are computed from the compared results of the evaluation means to thereby produce a color conversion table.

DETAILED DESCRIPTION OF THE INVENTION

An embodiment of the present invention will now be explained with reference to the accompanying drawings.

Figure 1:
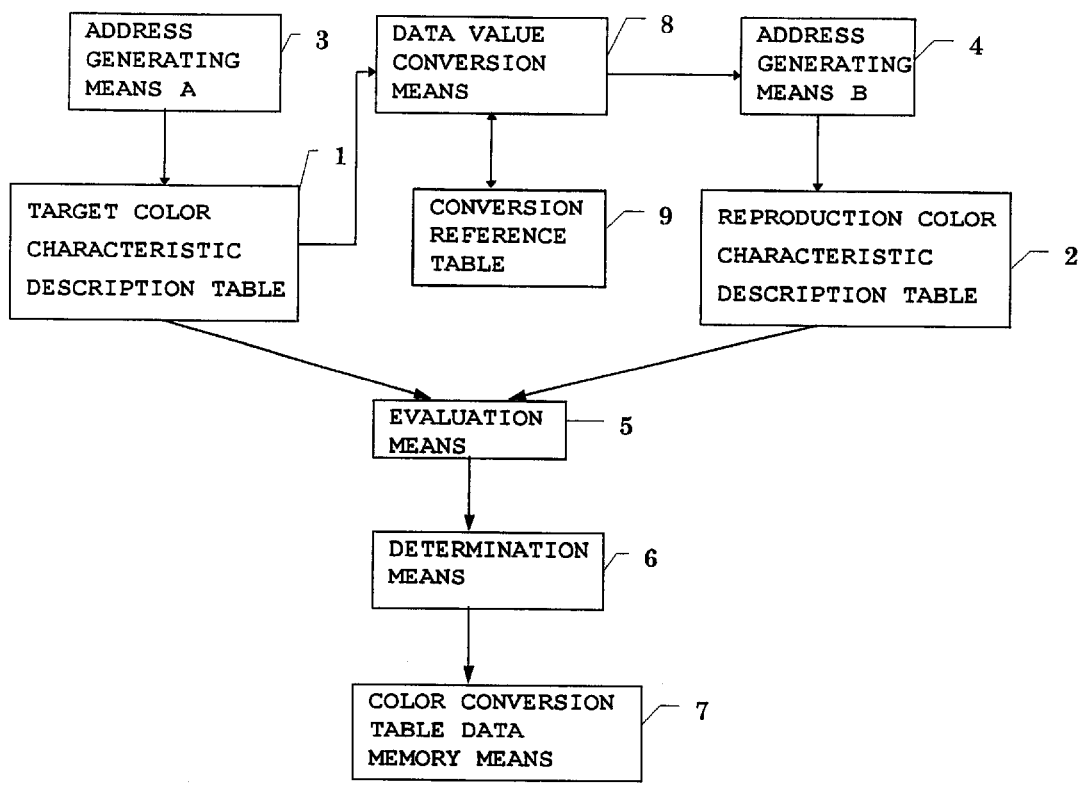
FIG. 1 is a block diagram illustrating a method of producing a color conversion table according to the present invention.
Figure 2:
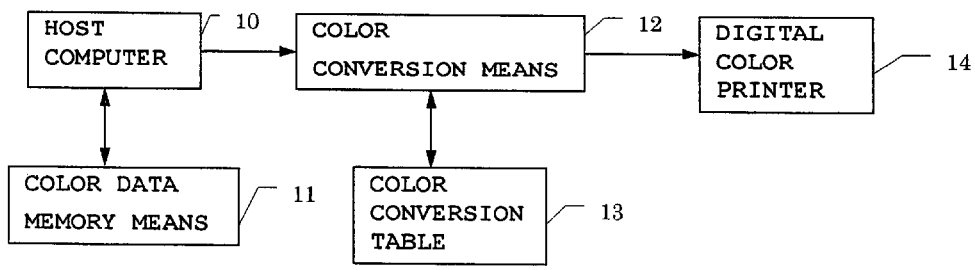
FIG. 2 is a constructional view illustrating a case where color conversion is performed by referring to the color conversion table.

FIG. 1 is a block diagram illustrating a color conversion table production method according to the present invention. Reference numeral 1 denotes a target color characteristic description table, 2 denotes a reproduction color characteristic description table, 3 denotes address generating means A for generating an address value with respect to the target color characteristic description table 1, 4 denotes address generating means B for generating an address value with respect to the reproduction color characteristic description table 2, 5 denotes evaluation means, 6 denotes determination means and 7 denotes color conversion table data memory means. The foregoing constituent components are substantially the same as those illustrated in FIG. 3. Reference numeral 8 denotes data value conversion means for converting the values of data (K), (C), (M), (Y) and (K) of input data to the value of data (K) that corresponds to a reproduction color output address. Reference numeral 9 denotes a conversion reference table to which reference is made when performing data value conversion by the data value conversion means.

In FIG. 1, with respect to the (C), (M), (Y) and (K) values generated by the address generating means 3 according to the control of control means (not illustrated), the target color characteristic description table 1 sends to the evaluation means the color values corresponding to the (C), (M), (Y) and (K) values. Also, the target color characteristic description table 1 sends the data values of (K) or (C), (M), (Y) and (K) to the data value conversion means 8. The data value conversion means 8 produces a black data item (K') based upon the values of the target color characteristic table according to the (K) or (C), (M), (Y) and (K) data by referring to the conversion reference table 9. The control means causes the address generating means B 4 to generate with respect to one set of (C), (M), (Y) and (K) values generated by the address generating means A 3 all combinations of (C), (M) and (Y) values corresponding to the input of the reproduction color characteristic description table 2.

Figure 3:
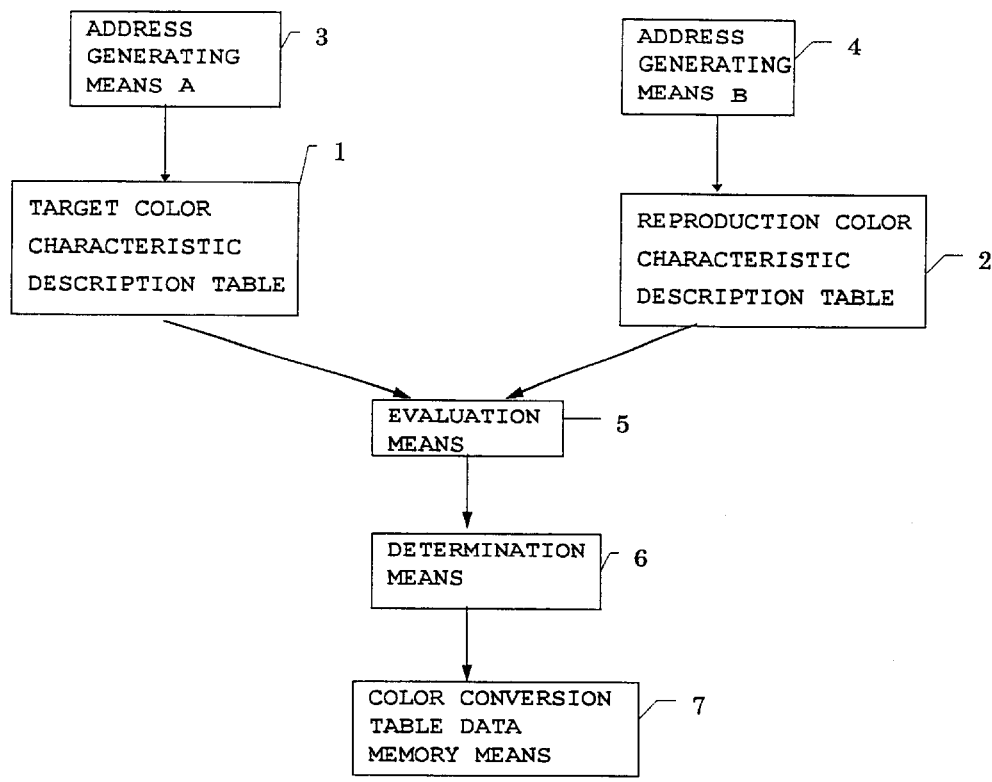
FIG. 3 is a block diagram illustrating a known method of producing a color conversion table.

The reproduction color characteristic description table 2 sends to the evaluation means the color values corresponding to the (C), (M) and (Y) values generated from the address generating means B 4 and the (K') converted by the data value conversion means 8 and these color values are compared with each other in the evaluation means 5, whereby comparison and evaluation are made as in the case of FIG. 3. Further, the determination means 6 makes its determination based on the evaluated value of the evaluation means and thereby selects one set of color values (C'), (M') and (Y') of the reproduction color characteristic description table 2 as in the case of FIG. 3. Also, the control means causes the color conversion table data memory means 7 to store therein the color data values (C'), (M') and (Y') selected by the determination means and the (K') converted by the data value conversion means 8 as post-conversion (C), (M), (Y) and (K) values of the color conversion table obtained from the address generating means 3.

The control means performs the above-described operation while looping sequentially through the (C), (M), (Y) and (K) values generates by the address generating means 3. As a result, a color conversion table necessary for color conversion is produced in the color conversion table data memory means.

Next, a method of converting the color data of (K) in the data value conversion means 8 will be explained. First, a case where the conversion reference table 9 is one-dimensional will be explained.

Figure 4:
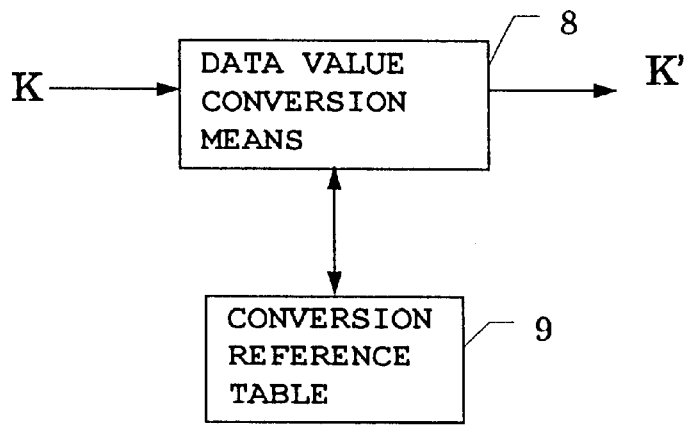
FIG. 4 is a constructional view illustrating an embodiment of data value conversion means according to the present invention.

FIG. 4 is a constructional view illustrating an embodiment of the data value conversion means according to the present invention. The value of (K) in the target color characteristic description table 1 in FIG. 1 is converted in the data value conversion means 8 to (K') with reference the conversion reference table 9. As a method of producing a one-dimensional conversion reference table 9 there is a method, as an example, wherein the lightness of the color value of the color data K of black corresponding to the target color output apparatus is made to correspond with the lightness of the color value of the color data K' of black corresponding to the reproduction color output apparatus. In this case, first, the gradation pattern of a measurable single color of black is printed by each of the target color output apparatus and reproduction color output apparatus and this gradation pattern has its colors measured to thereby obtain color values. At this time, it is not necessary to print the gradation pattern in regard to all obtainable values of each of the (K) and (K') and it is sufficient that the gradation be printed and color measured at suitable intervals and the rest gradation values be determined by interpolation computation. Thereafter, with respect to the respective values of (K) of the target color output apparatus, determination is made of the correspondence of the values of (K') of the reproduction color output apparatus enabling the procurement of equal lightnesses, the results being recorded in the conversion reference table 9. In the embodiment of the one-dimensional conversion reference table 9, in a case where the black of the target color output apparatus and the black of the reproduction color output apparatus are not completely achromatic colors and there is a difference in hue and chroma between the both blacks, this results in that color reproduction is done with (C'), (M') and (Y') being added to (K'). This results in that even when lightness correspondence holds true with regard to only the (K') alone, the lightness decreases due to the addition thereto of (C'), (M') and (Y'), with the result that a change occurs in the direction in which the difference in hue or chroma between the blacks decreases. Therefore, when trying to evaluate and determine at a minimum color difference, there inconveniently occurs a case where optimum evaluation is done even when lightness correspondence does not hold true sufficiently. Therefore, the conversion reference table 9 of (K) and (K') may be produced with the value of (K') being made to be a value smaller than a normal value, e.g. value which is 80% thereof in order to leave a room for adjustment of the hue, chroma and lightness obtainable with the addition of (C), (M) and (Y) components.

Next, a case where the conversion reference table 9 is four-dimensional will be explained.

Figure 6:
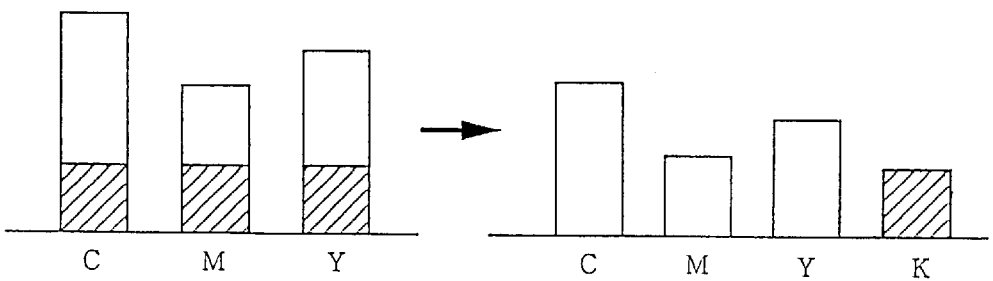
Figure 5:
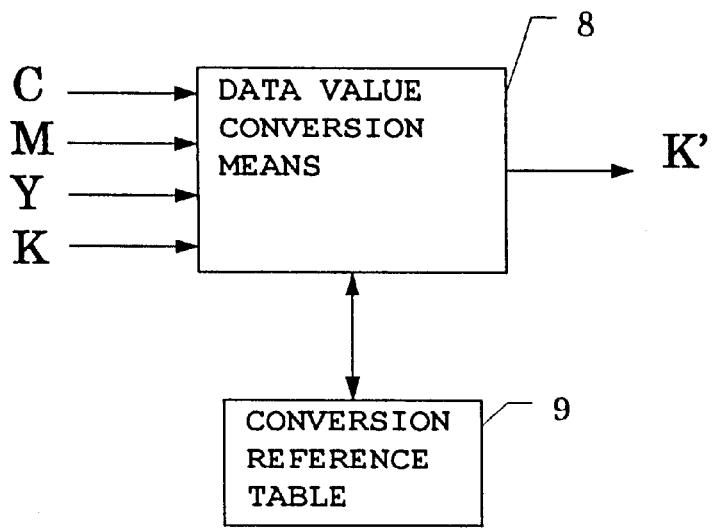
FIG. 5 is a constructional view illustrating another embodiment of the data value conversion means according to the present invention. And, FIG. 6 is an explanatory view of GCR.

FIG. 5 is a constructional view illustrating another embodiment of the data value conversion means according to the present invention. The values of (C), (M), (Y) and (K) in the target color characteristic description table 1 in FIG. 1 are converted in the data value conversion means 8 to (K') by referring to the conversion reference table 9. At this time, the conversion reference table 9 becomes a four-dimensional table because the output value of (K') is determined by the four values of (C), (M), (Y) and (K). As a method of producing the four-dimensional conversion reference table 9 there is a method, as an example, of using data value of black that is obtained with the use of a GCR (=Gray Component Replacement, replacement of the gray component) technique in color separation that is well known in the field of printing. FIG. 6 is an illustration of the GCR process. In the GCR process, with regard to the (C), (M) and (Y) values, parts of their respective minimum values are replaced by the (K) and the original (C), (M) and (Y) values are decreased by the values corresponding to the replaced values. On this account, according to the reproduction color characteristic description table described with color values with respect to the reproduction color output apparatus, these values are converted once to (C), (M) and (Y) values and then a (K) component is further produced using the GCR technique. This value of (K) is obtained with respect to each combination of the input values (C), (M), (Y) and (K) of the reproduction color output apparatus and therefore the resulting values can be used as the four-dimensional conversion reference table 9.

It is to be noted that in the method of producing the conversion reference table 9 if the value of (K') is appropriate, it may be not limited to the above-described method and, for example, the value of (K') may be aptly determined from, for example, empirical knowledge or the like. Also, although the above explanation has been given of the case where (L*, a*, b*) are used as the color values, other color values, e.g. (L*, u*, v*), (X, Y, Z) or the like may be used.

As described above, according to the present invention, in a case where the reproduction color output apparatus makes its color reproduction with the use of four colors, also, it has become possible to produce the color conversion table easily and highly precisely.

What is claimed is:

1. A color conversion table production apparatus for producing a color conversion table for converting a set of first color data comprising, at least, cyan, magenta, yellow and black input color data used for outputting a color from a target color output apparatus into a set of second color data, the set of second color data used for outputting a color from a reproduction color output apparatus, so that a color output by the reproduction color output apparatus is the same or similar to a color output by the target color output apparatus in response to the same color input data, the color conversion table producing apparatus comprising: a pre-stored target color characteristic description table for defining a relationship between input color data supplied to the target color output apparatus and an actual color output therefrom, so that data representing the actual color output by the target color output apparatus based on a given set of color input data may be obtained by reference to the target color characteristic description table; a pre-stored reproduction color characteristic description table for defining a relationship between input color data supplied to the reproduction color output apparatus and an actual color output therefrom, so that data representing the actual color output by the reproduction color output apparatus based on a given set of color input data may be obtained by reference to the reproduction color characteristic description table; data value conversion means for converting input color data supplied to the target color output apparatus into black color data used for outputting black color by the reproduction color output apparatus; evaluation means for comparing color value data obtained by reference to the target color characteristic description table for a given set of input color data and color value data obtained by reference to the reproduction color characteristic description table for the given set of input color data and the converted black color data obtained by the data value conversion means; and computing means for computing a set of second color data used for outputting a color with the reproduction color output apparatus based on a set of first color input data used for outputting a color with the target color output apparatus based on the comparison results of the evaluation means for each of a plurality of different sets of first color input data to produce a color conversion table.

2. A color conversion table production apparatus as set forth in claim 1; wherein the data value conversion means includes means for converting data values of black data contained in the input color data with reference to a one-dimensional conversion reference table.

3. A color conversion table production apparatus as set forth in claim 2; wherein the one-dimensional conversion reference table is produced from the color values of black color data corresponding to the target color output apparatus and the color values of black color data corresponding to the reproduction color output apparatus.

4. A color conversion table production apparatus as set forth in claim 2; wherein the one-dimensional conversion reference table comprises data representing color values of black color data output using the target color output apparatus and color values of color data of a plurality of colors other than black output using the reproduction color output apparatus so that different shades of black obtainable using the target color output apparatus may be obtained with the reproduction color output apparatus by adding colors other than black.

5. A color conversion table production apparatus as set forth in claim 1; wherein the data value conversion means includes means for converting cyan, magenta, yellow and black input color data into black data with reference to a four-dimensional conversion reference table.

6. A color conversion table production apparatus as set forth in claim 5; wherein the four-dimensional conversion reference table is produced from a black data value obtained using a GCR technique with respect to cyan, magenta, yellow and black data values corresponding to the reproduction color output apparatus.

7. An apparatus for producing a color conversion table used for converting a set of first color data into a set of second color data, the apparatus comprising: a pre-stored target color characteristic description table for defining a relationship between a first set of input color data supplied to a target color output apparatus and an actual color output therefrom; a reproduction color characteristic description table for defining a relationship between a second set of input color data supplied to a reproduction color output apparatus and an actual color output therefrom; data value conversion means for converting the fist set of input color data to black color data corresponding to the reproduction color output apparatus; evaluation means for comparing color data from the target color characteristic description table corresponding to color input data for the target color output apparatus and color data from the reproduction color characteristic description table corresponding to the same color input data and the converted black color data; and computing means for computing a set of second color data used for outputting a color with the reproduction color output apparatus based on a set of first color input data used for outputting a color with the target color output apparatus based on the comparison results of the evaluation means for each of a plurality of different sets of first color input data to produce a color conversion table.

8. An apparatus for producing a color conversion table according to claim 7; wherein the first color data and the second color data comprise color data of at least cyan, magenta, yellow and black color data.

9. An apparatus for producing a color conversion table according to claim 7; wherein the data value conversion means includes means for converting data values of black data from the input color data with reference to a one-dimensional conversion reference table.

10. An apparatus for producing a color conversion table according to claim 9; wherein the one-dimensional conversion reference table is produced from the color values of black color data corresponding to the target color output apparatus and the color values of black color data corresponding to the reproduction color output apparatus.

11. An apparatus for producing a color conversion table according to claim 9; wherein the data value conversion means includes means for converting cyan, magenta, yellow and black input color data to black data with reference to a four-dimensional conversion reference table.

12. A color conversion table production apparatus as set forth in claim 11; wherein the four-dimensional conversion reference table is produced from a black data value obtained using a GCR technique with respect to cyan, magenta, yellow and black data values corresponding to the reproduction color output apparatus.

* * * * *